Patented Aug. 10, 1948

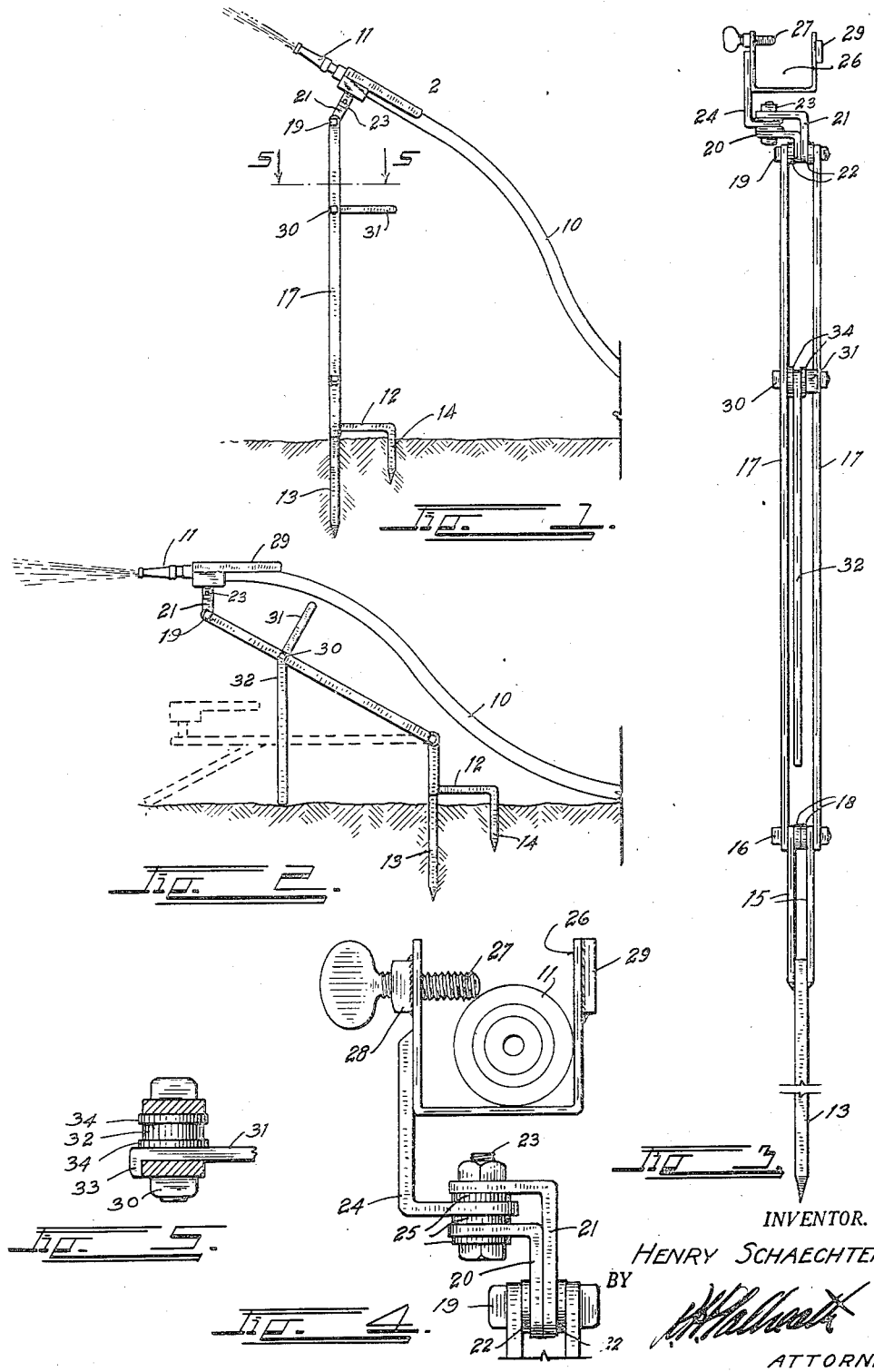

2,446,723

UNITED STATES PATENT OFFICE 2,446,723

LAWN NOZZLE SUPPORT

Henry Schaechterle, Denver, Colo.

Application September 21, 1945, Serial No. 617,753

1 Claim. (Cl. 248—81)

This invention relates to a support for the nozzle extremity of a garden hose, and has for its principal object the provision of a simple and highly efficient hose holder which can be adjusted in a multitude of ways so as to position the nozzle at any desired height above the ground and at any desired vertical and horizontal angle so that a wide area may be covered from a single setting of the holder, regardless of the shape and position of the area.

Another object of the invention is to provide a novel clamping device for the holder which will accommodate hoses and nozzles of various types, sizes, and styles.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved hose holder as it would appear in use when holding a hose nozzle at a relatively high elevation;

Fig. 2 is a similar view illustrating the nozzle positioned at a lower elevation and on a horizontal plane;

Fig. 3 is an edge view of the improved hose holder;

Fig. 4 is an enlarged detail view illustrating a universal joint and hose clamp as employed on the improved holder; and Fig. 5 is a similarly enlarged cross-section, taken on the line 5—5, Fig. 1.

In the drawing, a typical garden hose is indicated at 10, with its nozzle at 11.

The improved holder comprises an inverted U-shaped foot member 12 having a relatively long, pointed, ground-engaging prong 13, and a similar shorter ground-engaging prong 14. Two upstanding frame bars 15 are welded or otherwise secured on the opposite sides of the foot member 12 and extend upwardly therefrom, preferably over the longer prong 13.

The upper extremities of the frame bars 15 are perforated for the passage of a lower clamp bolt 16. The clamp bolt 16 serves as a hinge member for a pair of hinged bars 17, which are clamped on opposite sides of the frame members 15 by means of the bolt 16, the frame members being maintained separated by separating washers 18 surrounding the bolt 16.

The upper extremities of the hinged bars 17 carry an upper clamp bolt 19 extending through perforations therein. The upper clamp bolt serves to clamp a short angle member 20 and a long angle member 21 between the bars 17, separated therefrom by means of suitable friction washers 22. The horizontal legs of the angle members 20 and 21 lie parallel to each other to receive a vertical pivot bolt 23. The bolt 23 serves to clamp an angle bracket member 24 between the angle members 20 and 21, separated therefrom by means of friction washers 25.

The bracket 24 is welded to or otherwise secured to a U-shaped hose socket 26 in which the hose 10 or the nozzle 11 may be clamped in place by means of a clamp screw 27 threaded through a nut member 28 secured to, or formed on, the side of the hose socket 26.

A first handle member is welded to or otherwise secured to the hose socket 26 and extends rearwardly therefrom. A third clamping bolt 30 extends between the connecting bars 17 intermediate their extremities. This third clamping bolt serves to support a second handle member 31 and a hinge brace member 32 between the bars 17 intermediate the extremities of the latter. A hook 33 is formed on the inner extremity of the second handle member 31 to engage the edge of one of the bars 17 to maintain the handle member at right angles to the bar. The brace member 32 is clamped between two friction washers, as shown in Fig. 5.

In use, the hose 10 or the nozzle 11 is placed in the socket 26 and the screw 27 is tightened to engage the hose or nozzle, as shown in Fig. 4. The handle is then carried to the desired position and the prongs 13 and 14 are forced into the ground by pressing one's foot on the foot member 12.

The height of the nozzle 11 is regulated by swinging the bars 17 forwardly or backwardly on the frame members 15. The vertical angle of the nozzle is adjusted by swinging the angle members 20 and 21 on the clamp bolt 19. The horizontal angle of the stream is adjusted by turning the bracket member 24 about the axis of the clamp bolt 23. The nozzle can be lowered by swinging the bars 17 forwardly, as shown in the full and broken line positions of Fig. 2. Thus any desired position of the stream may be obtained.

The brace member 32 serves to support the connecting bars 17 when in any other position than the vertical position, as shown in Fig. 2.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A garden hose nozzle support comprising: an inverted U-shaped, ground-engaging foot member; two frame bars extending upwardly from said foot member in parallel relation; a pair of hinged bars; a first clamp bolt securing the lower extremities of the hinged bars on opposite sides of said frame bars; a short angle member; a long angle member; a second clamp bolt, said latter bolt securing the vertical legs of both angle members between the upper extremities of said hinged bars with the horizontal legs in parallel relation; an angle bracket member; a third clamp bolt clamping the horizontal leg of said angle bracket member between the horizontal legs of said short and long angle members; a U-shaped hose socket secured to and supported by the vertical leg of said angle bracket member; means for securing the hose nozzle in said socket; a fourth clamp bolt extending through said hinged bars intermediate the extremities of the latter; a handle member; and a hinged brace member, said handle member and said brace member being mounted on and secured in place by said fourth clamp bolt.

HENRY SCHAECHTERLE.

REFERENCES CITED

The following references are of record in the file of this patent:

UNITED STATES PATENTS

| Number | Name | Date |
|---|---|---|
| 929,392 | Cole | July 27, 1909 |
| 954,902 | Titus | Apr. 12, 1910 |
| 1,123,900 | Leslie et al. | Jan. 5, 1915 |